United States Patent [19]

Miyakawa et al.

[11] 4,345,282
[45] Aug. 17, 1982

[54] APPARATUS FOR BRINGING WIRE-SHAPED OR TAPE-SHAPED CARRIER INTO CONTACT WITH CARRIER GUIDE MEMBER

[75] Inventors: Seii Miyakawa; Akira Kawauchi, both of Yokohama; Kazunori Iijima, Shimoinayoshi; Takao Terayama, Kashiwa; Masashi Yoshida, Nakaminato; Hideyuki Kawase, Katsuta, all of Japan

[73] Assignee: Hitachi, Ltd., Tokyo, Japan

[21] Appl. No.: 166,754

[22] Filed: Jul. 7, 1980

[30] Foreign Application Priority Data

Jul. 6, 1979 [JP] Japan .................................. 54-84950

[51] Int. Cl.³ .............................................. G11B 15/66
[52] U.S. Cl. .................................. 360/85; 360/130.22; 242/198
[58] Field of Search ................... 360/85, 95, 130, 132, 360/84; 242/197–200, 55.19 A

[56] References Cited

U.S. PATENT DOCUMENTS

| | | | |
|---|---|---|---|
| 4,012,788 | 3/1977 | Blanding | 360/85 |
| 4,015,292 | 3/1977 | Kirn | 360/130 |
| 4,045,820 | 8/1977 | Staar | 360/85 |
| 4,092,684 | 5/1978 | Umeda | 360/85 |
| 4,115,825 | 9/1978 | Hayashi et al. | 360/85 |
| 4,126,888 | 11/1978 | Hayashi et al. | 360/95 X |
| 4,258,399 | 3/1981 | Iijima et al. | 360/85 |

*Primary Examiner*—John H. Wolff
*Attorney, Agent, or Firm*—Craig and Antonelli

[57] ABSTRACT

A system for bringing a wire-shaped or tape-shaped carrier into contact with a carrier guide member in a predetermined position includes carrier withdrawing guide members each movable between an operative position in which the carrier is brought into contact with the carrier guide member and an inoperative position in which the carrier is out of contact with the carrier guide member. A plurality of strip-shaped power transmitting members formed to be flexible and connected at one end thereof to the carrier withdrawing guide members respectively are each slidably fitted in one of guide grooves of a guide groove member formed as an insert on the base. A drive connected to a motor is in engagement with the strip-shaped power transmitting members to drive the same and move the carrier withdrawing guide members connected to the strip-shaped power transmitting members, whereby the carrier withdrawing guide members can be moved between the operative and inoperative positions.

8 Claims, 27 Drawing Figures

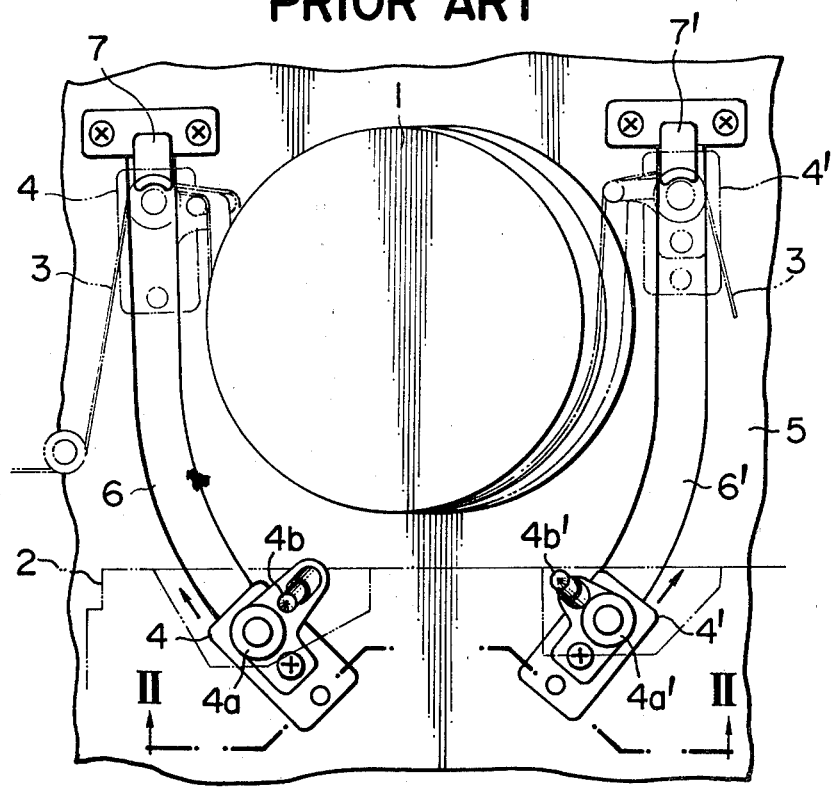
FIG. I
PRIOR ART
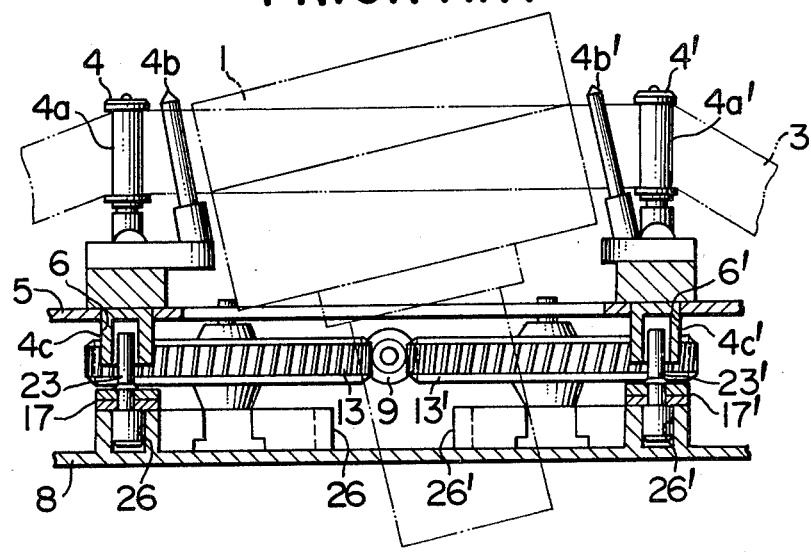
FIG. 2
PRIOR ART

APPARATUS FOR BRINGING WIRE-SHAPED OR TAPE-SHAPED CARRIER INTO CONTACT WITH CARRIER GUIDE MEMBER

BACKGROUND OF THE INVENTION

1. Field of the Invention

This invention relates to an apparatus for bringing a wire-shaped or tape-shaped carrier, such as a magnetic tape, into contact with a carrier guide member, such as a drum-like tape guide member in a predetermined position and returning the same to the original position, and more particularly it is concerned with a mechanism for driving and guiding means for moving a wire-shaped or tape-shaped carrier to a predetermined position while being maintained in contact therewith. The system for bringing a carrier into contact with a carrier guide member according to the invention is particularly suitable for use as an apparatus for bringing a magnetic tape into contact with a tape guide member of a magnetic recording and reproducing apparatus, for example.

2. Description of the Prior Art

In a video tape recorder for household use, it is necessary to bring a magnetic tape into contact with a magnetic tape guide member having a built-in magnetic head for a circumferential extent on the order of more than 180°. An operation for bringing the magnetic tape into contact with the magnetic tape guide member in a predetermined position is very complex and requires a high accuracy. Proposals have been made to use various mechanisms for performing the operation of bringing a magnetic tape into contact with a magnetic tape guide member. One of such mechanisms (for example, that of U.S. Pat. No. 4,258,399) comprises link means including a plurality of links for driving magnetic tape withdrawing guide means, a mechanism for moving the link means between an operative position and an inoperative position, and guide means for guiding the link means. By moving the link means to the operative position, the tape withdrawing guide means can be actuated to withdraw a magnetic tape from a cassette, to bring the magnetic tape into contact with the magnetic tape guide member.

Some disadvantages are associated with the apparatus for bringing a tape into contact with the tape guide member of the aforesaid construction. The apparatus is very complex in construction and requires a large number of component parts. Thus there are raised the problems of requiring a number of process steps for fabricating the component parts and being low in reliability in the performance of the apparatus.

SUMMARY OF THE INVENTION

This invention has as its object the provision of an apparatus for bringing a wire-shaped or tape-shaped carrier into contact with a carrier guide member which is simple in construction and enables the carrier to be brought into contact with the carrier guide member readily with a high degree of accuracy.

According to the invention, there is provided an apparatus for bringing a wire-shaped or tape-shaped carrier into contact with a carrier guide member in a predetermined position comprising carrier withdrawing guide means movable between an operative position in which the carrier is withdrawn and brought into contact with the carrier support member and an inoperative position in which the carrier is not in contact with the carrier guide member, at least one flexible, strip-shaped power transmitting member connected at one end thereof to the carrier withdrawing guide means, guide means supporting the strip-shaped power transmitting member for movement along a predetermined path, and drive means in engagement with the strip-shaped power transmitting member for driving the same to move along said guide means.

The strip-shaped power transmitting member formed to be flexible is not limited to a strip-shaped member in a strict sense and may be in the form of plates or coils made of a plastic material which could readily been driven by the drive means for movement along the guide means such as a guide groove. The drive means may be of any known form so long as it is capable of moving the power transmitting members along the guide groove. The drive means may comprise rotary drive means, such as a gear, sprocket wheel, friction wheel, etc., which is engageable with projections and depressions or openings formed in the power transmitting member.

The above and other objects as well as the characterizing features of the invention will become more apparent from the following description taken in conjunction with the accompanying drawings.

BRIEF DESCRIPTION OF THE DRAWINGS

FIG. 1 is a plan view of a magnetic tape travel system of a magnetic recording and reproducing apparatus of the prior art, showing one constructional form;

FIG. 2 is a sectional view taken along the line II—II in FIG. 1;

In the drawings, like reference numerals are used to designate same or similar parts throughout the figures.

DESCRIPTION OF THE PREFERRED EMBODIMENT

Figure 3:
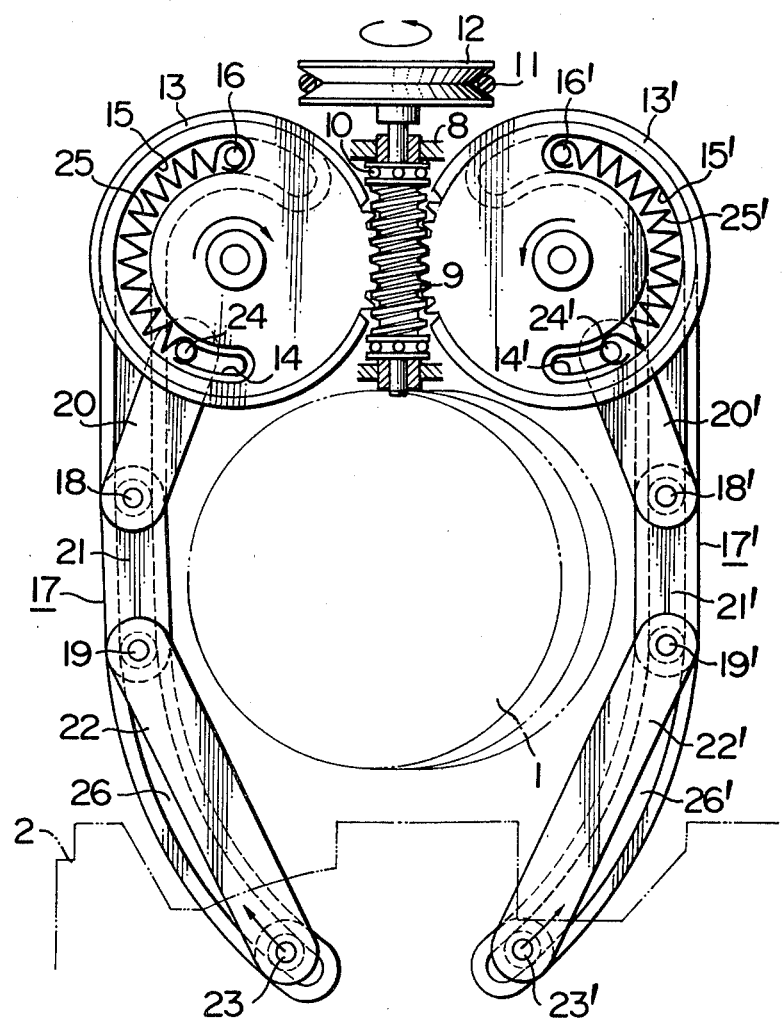
FIG. 3 is a plan view of the drive means for the magnetic tape withdrawing guide means used in the magnetic tape travel system shown in FIG. 1.

FIG. 1 shows a magnetic tape travel system of a magnetic recording and reproducing apparatus of the prior art, showing one constructional form thereof. As shown, a drum-like carrier guide member in the form of a magnetic tape guide member 1 has two rotary magnetic heads, not shown, located in diametrically opposed positions. The rotary magnetic heads and the magnetic tape guide member 1 constitute rotary magnetic head means. 2 designates a cassette having built-in tape paying out and tape take-up reels having a tape-shaped carrier in the form of a magnetic tape 3 wound thereon. 4 and 4' designate magnetic tape withdrawing guide means for withdrawing the magnetic tape 3 from the cassette 2 and passing same around the periphery of magnetic tape guide member 1 as shown in dash-and-dot lines in FIG. 1. The magnetic tape withdrawing guide means 4 and 4' include a guide roller 4a and an inclined post 4b and a guide roller 4a' and an inclined post 4b' respectively. When the cassette 2 has been inserted into a receiving section of the apparatus, the magnetic tape withdrawing guide means 4 and 4' are positioned within the cassette 2 as indicated in solid lines in FIG. 1. However, upon a recording or playback button, not shown, being depressed by the operator, the magnetic tape withdrawing guide means 4 and 4' move along guide grooves 6 and 6' respectively on a guide base 5 in the direction of an arrow, to withdraw the magnetic tape 3 from the cassette 2. The guide means 4 and 4' stop when they abut against positioning members 7 and 7' respectively as indicated in dash-and-dot lines in FIG. 1. This enables the magnetic tape to be brought into contact with the magnetic tape guide member 1.

A mechanism of the prior art for moving the magnetic tape withdrawing guide means 4 and 4' as described hereinabove will be described by referring to FIGS. 2 and 3, wherein parts similar to or the same as the parts shown in FIG. 1 are designated by like reference characters.

Prior to explaining in detail the moving mechanism for the magnetic tape withdrawing guide means 4 and 4', connections of the magnetic tape withdrawing guide means 4 and 4' to the guide base 5 will be described. As shown in FIG. 2, the magnetic tape withdrawing guide means 4 and 4' include projections 4c and 4c' which extend downwardly and are slidably received in guide grooves 6 and 6' respectively on the guide base 5 mounted on a base 8 through spacers. Arranged between the guide base 5 and the base 8 is the drive mechanism for the magnetic tape withdrawing guide means 4 and 4' which will be described in detail by referring mainly to FIG. 3.

Arranged on a side of the magnetic guide member 1 opposite the magnetic tape or at the back thereof is a worm 9 which is disposed near the center of the magnetic guide member 1 in a manner to face the front of the magnetic tape guide member 1. The worm 9, which is rotatably supported by bearings 10 on the base 8, has a pulley 12 mounted on its shaft which is connected to a motor, not shown, through a belt 11. Maintained in meshing engagement with the worm 9 are a pair of worm gears 13 and 13' which are disposed symmetrically with respect to the axis of the worm 9 at the back of the magnetic tape guide member 1 and supported, as shown in FIG. 2, by the guide base and base 8. The worm gears 13 and 13' have slots 14 and 14', spring guide grooves 15 and 15' and spring locking pins 16 and 16' respectively. The worm gears 13 and 13' may be formed of a light material, such as a plastic material.

Link means 17 and 17' connected to the worm gears 13 and 13' respectively comprise links 20–21 and 20'–21' connected to one another by pins 18 and 19 and 18' and 19' for pivotal movement in this embodiment. The links 22 and 22' of the link means 17 and 17' disposed on the magnetic tape side are connected at their ends through pins 23 and 23' to the projections 4c and 4c' of the tape withdrawing guide means 4 and 4' respectively as shown in FIG. 2. The links 20 and 20' of the link means 17 and 17' disposed on the worm gear side are connected at their ends to the worm gears 13 and 13' through pins 24 and 24' engaged in the slots 14 and 14' in the worm gears 13 and 13' respectively. Springs 25 and 25' are arranged along the guide grooves 15 and 15' and connected to the spring locking pins 16 and 16' respectively. The springs 25 and 25' which perform the function of absorbing excess payout of the magnetic tape 3 by the magnetic tape withdrawing guide means 4 and 4' are given with initial tension urging the pins 24 and 24' to abut against one edge of the slots 14 and 14' respectively.

Figure 4:
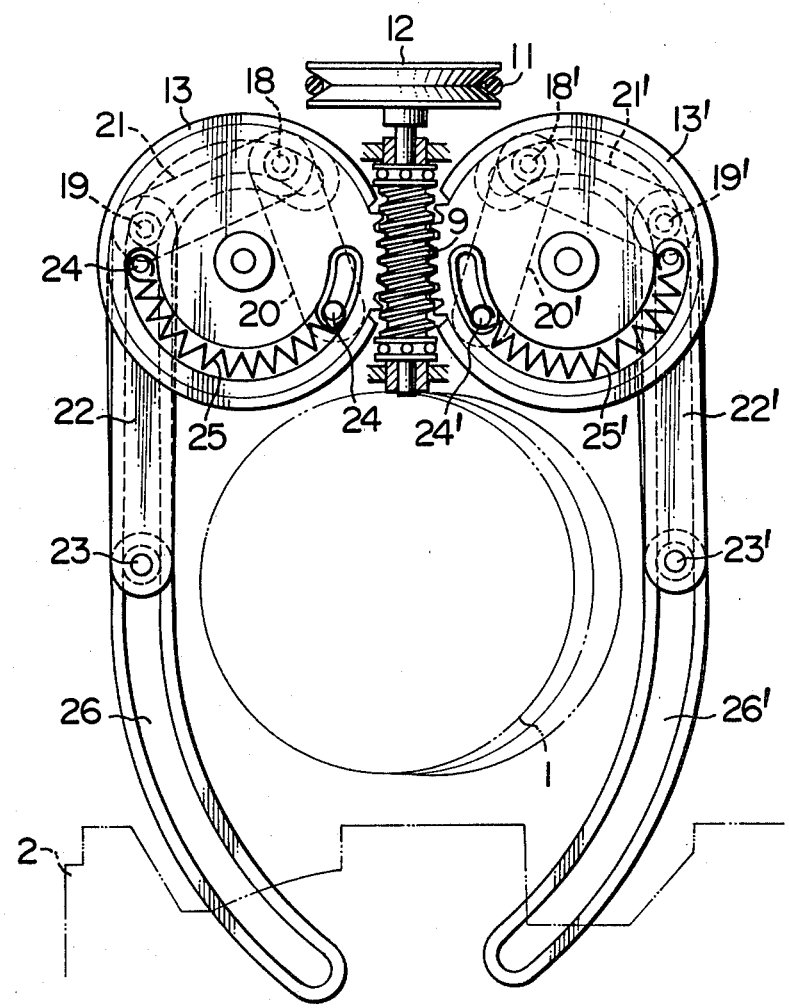
FIG. 4 is a plan view in explanation of the drive means shown in FIG. 3.

The base 8 has attached thereto guide members 26 and 26' for guiding the pins 18, 19, 23 and 18', 19', 23' of the link means 17 and 17' respectively. The guide members 26 and 26' extend from below the undersurface of the cassette 2 inserted in a position in front of the magnetic tape guide member 1 to below the undersurfaces of the worm gears 13 and 13' at the back of the member 1 by passing by the sides of the member 1. Portions of the guide members 26 and 26' disposed below the undersurfaces of the worm gears 13 and 13' are each in the form of an arc centered at the center of one of the worm gears 13 and 13'. By shaping the portions of the guide members 26 and 26' below the worm gears 13 and 13' in an arcuate form, the links 20, 21 and 20', 21' of the link means 17 and 17' respectively can be pulled together into an operative position as shown in FIG. 4 when the magnetic tape 3 is withdrawn from the cassette 2.

Operation of the example of the tape contacting system described hereinabove will be described. The cassette 2 is inserted, with the magnetic tape withdrawing guide means 4 and 4' being both disposed in front of the magnetic tape guide member 1 as shown in FIG. 1. Then the operator pushes a recording or playback button, not shown, to rotate the worm 9 in the direction of an arrow in FIG. 3 through the motor, belt 11 and pulley 12. This causes the worm gear 13 to rotate clockwise and the worm gear 13' to rotate counterclockwise. As a result, the link means 17 and 17' are moved to positions in an upper portion of FIG. 3 by the springs 25 and 25' and pins 24 and 24'. At this time, the pins 18, 19 and 23 and 18', 19' and 23' of the link, means 17 and 17' are fitted in the guide members 26 and 26' respectively, so that the link means 17 and 17' can be guided smoothly by the guide members 26 and 26' respectively.

Thus the magnetic tape withdrawing guide means 4 and 4' are moved by the link means 17 and 17' along the guide grooves 6 and 6' respectively on the guide base 5, to thereby withdraw the magnetic tape 3 from the cassette 2. Thereafter the link means 17 and 17' continue their movement until the magnetic tape withdrawing guide means 4 and 4' abut against the positioning members 7 and 7' respectively and stop. This state is detected as by a microswitch which generates a signal to stop the supply of current to the motor. The detailed description of this operation will be omitted. At this time, the links 20, 21 and 20', 21' of the link means 17 and 17' are guided, as shown in FIG. 4, by the guide members 26 and 26' and pulled together beneath the undersurfaces of the worm gears 13 and 13' respectively.

The tape contacting system of the aforesaid construction and operation is complex in construction and has a large number of component parts. This increases the process steps required for fabricating the parts and places limits on possible improvements in the reliability of the system.

Figure 5:
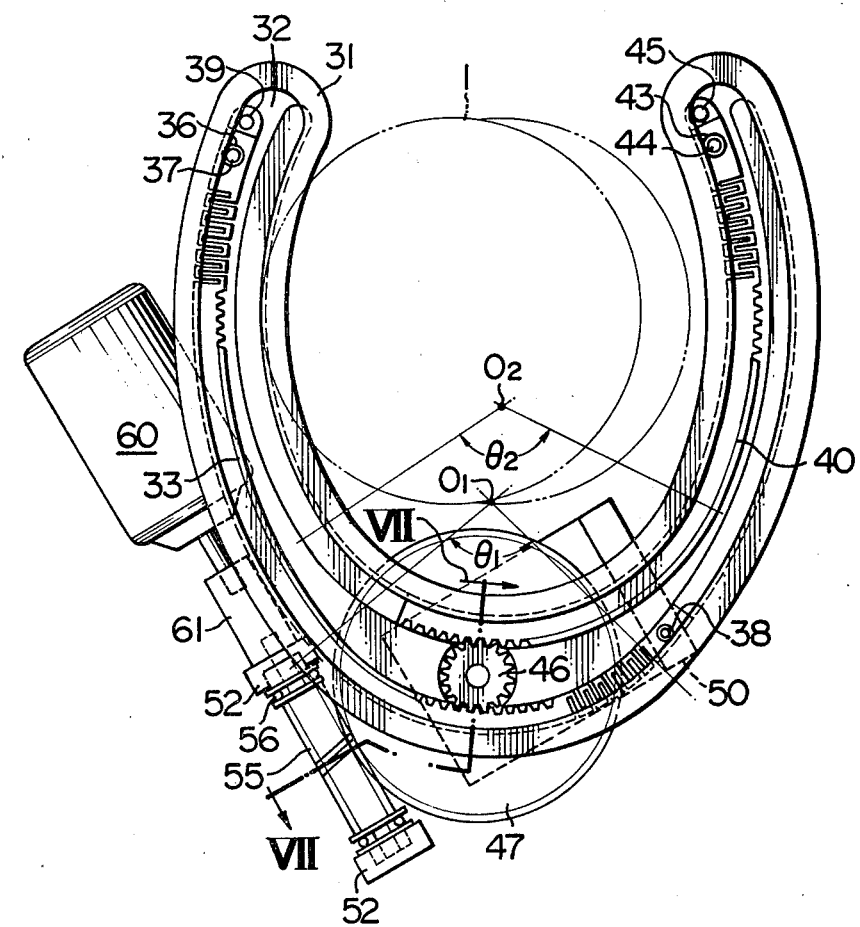
FIG. 5 is a plan view of the drive means for the magnetic tape withdrawing guide means comprising one embodiment of the invention.
Figure 6:
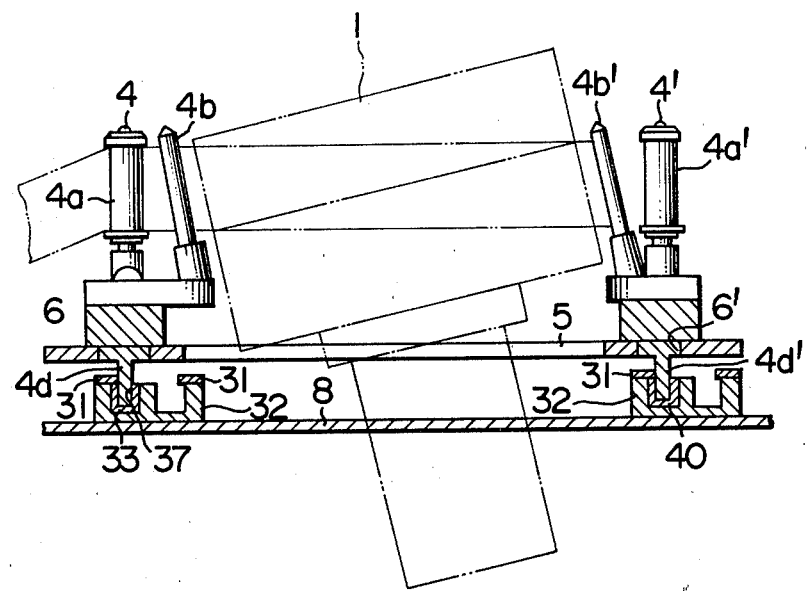
FIG. 6 is a sectional view showing the magnetic tape withdrawing guide means in combination with the drive means shown in FIG. 5.

FIGS. 5 and 6 show one embodiment of the system for bringing a carrier into contact with a carrier guide member in conformity with the invention. The contacting system shown is constructed as a magnetic tape contacting system which obviates the disadvantages of the prior art system shown in FIGS. 1–4.

Referring to FIGS. 5 and 6, a guide groove member 32 made of a plastic material having two grooves and bent at a desired curvature is formed as an projection on the base 8. As shown in FIG. 6, racks 33 and 40, formed to be flexible, are fitted in the grooves in an angular cross section suitable for sliding movement. The racks 33 and 40 are examples of the strip-shaped power transmitting members. As shown in FIG. 5, an opening is formed in a position between the two grooves of the guide groove member 32 to communicate with the grooves for mounting a pinion 46. The outer groove of the guide groove member 32 has fitted therein the rack 33 which is formed with a tooth shape of an internal gear of a curvature centered at $O_1$ in meshing engagement with the pinion 46, and the inner groove thereof has fitted therein the rack 40 which is formed with a tooth shape of an outer gear of a curvature centered at $O_2$ in meshing engagement with the pinion 46. The racks 33 and 40 which are flexible are constructed to be slidable in opposite directions through meshing engagement with the pinion 46.

In FIGS. 5 and 6, 1, 4 and 5 designate a drum-like magnetic tape guide member, magnetic tape withdrawing guide means and a guide base respectively. 6 and 6' designate guide grooves. They are substantially similar in construction to the magnetic tape guide member 1, magnetic tape withdrawing guide means 4, guide base 5 and guide grooves 6 and 6' respectively shown in FIGS. 1 and 2.

Figure 7:
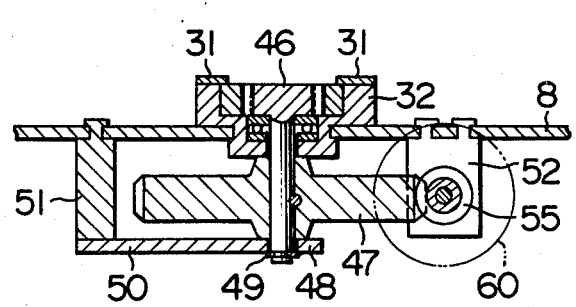
FIG. 7 is a sectional view taken along the line VII—VII in FIG. 5.

The pinion 46 is mounted in the opening formed between the grooves of the guide groove member 32 on the base 8 as shown in FIGS. 5 and 7. The pinion 46 has a shaft formed integrally therewith which receives and supports a work wheel 47 force fitted over the shaft and in meshing engagement with a worm shaft 55 supported by a bracket 52 and supporting on its extention a motor 60 connected thereto through a joint 61. The shaft over which the worm wheel 47 is force fitted is integral with the pinion 46 and supported by brackets 50 and 51. A stopper 39 is provided at one end of the outer groove of the guide groove member 32 on the base plate 8, and another stopper 45 is provided at one end of the inner groove thereof.

Figure 8:
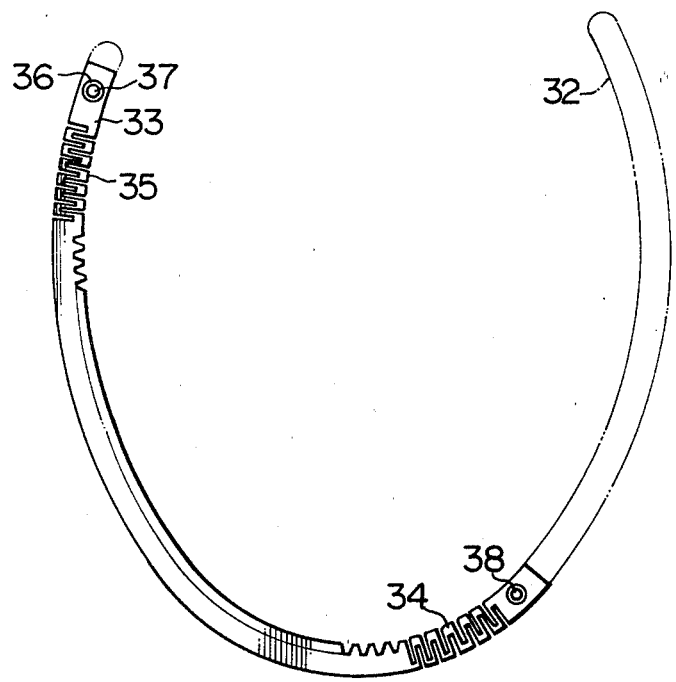
FIGS. 8–11 are plan views of various forms of flexible racks used in the invention.
Figure 9:
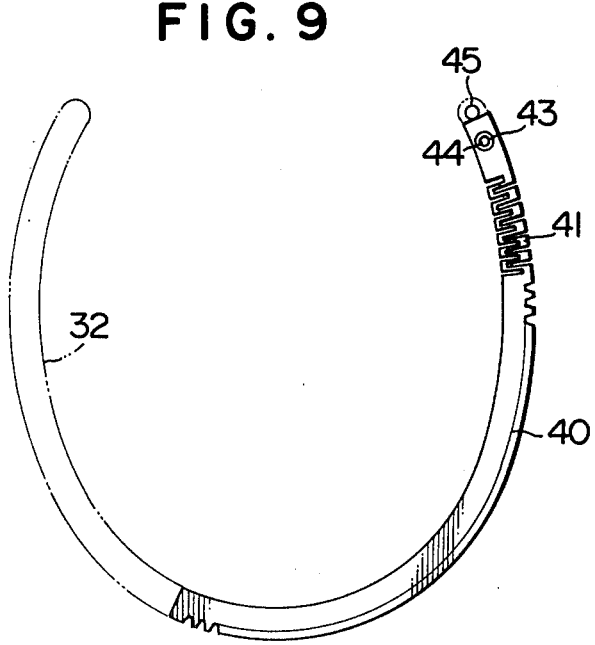
Figure 10:
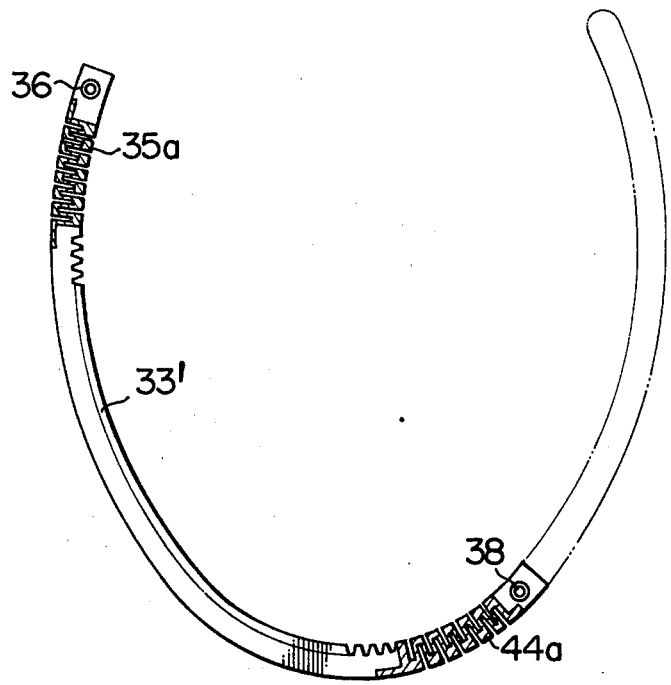
Figure 11:
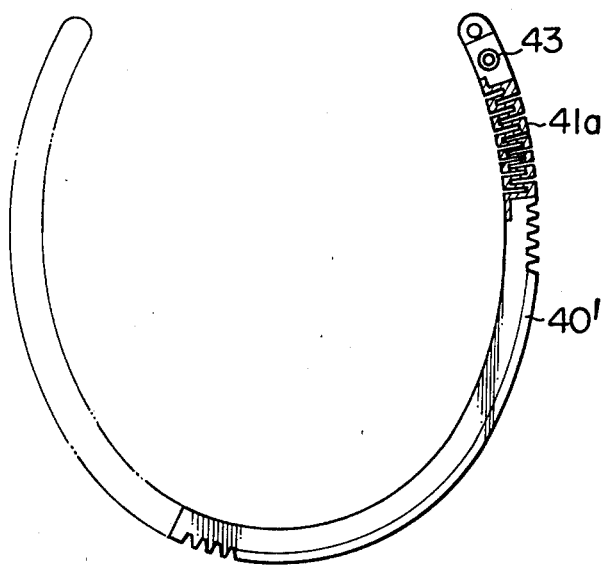
Figure 16:
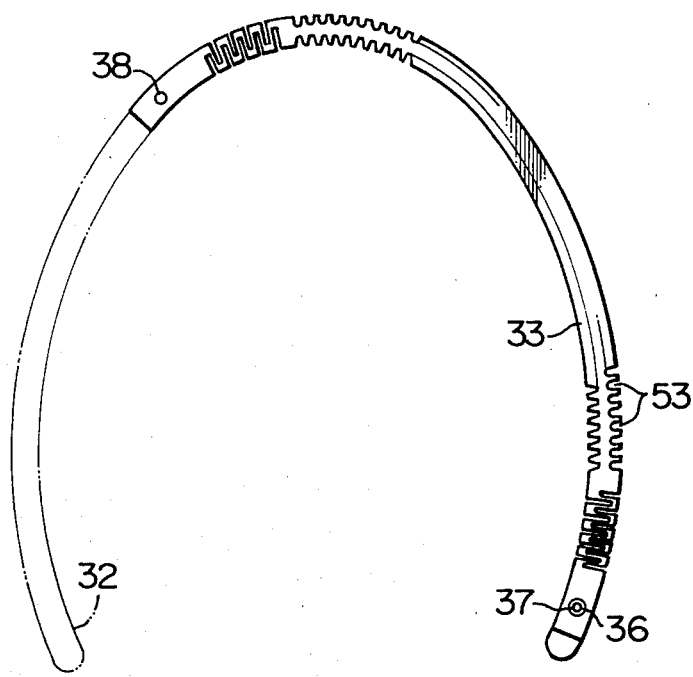
FIGS. 16 and 17 are plan views of other forms of flexible racks.
Figure 17:
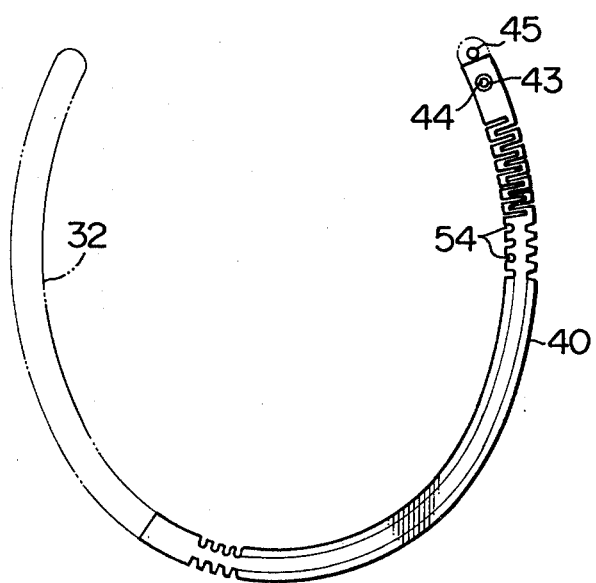

The flexible racks 33 and 40 fitted in the grooves of the guide groove member 32 will be described. In FIGS. 8 and 9, the outer flexible rack 33 and inner flexible rack 40 are formed with spring sections 34, 35 and 41 and have guide openings 37 and 44 reinforced by inserts 36 and 44 respectively at end portions thereof. As shown in FIGS. 10 and 11, the spring sections may comprise springs 34a, 35a and 41a molded of a material dissimilar to the material of racks 33' and 40'. Also, the flexible racks 33 and 40 may be formed with U-shaped cutouts 53 and 54 respectively of the same pitch as the tooth pitch of the pinion 46 disposed continuously in positions corresponding to the rack 46 as shown in FIGS. 16 and 17, to thereby increase the flexibility of the racks 33 and 40.

Figure 13A:
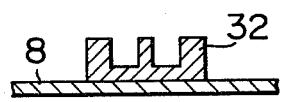
FIGS. 13(A)–13(C) are sectional views taken along the lines XIIIA—XIIIA, XIIIB—XIIIB and XIIIC—XIIIC respectively in FIG. 12.
Figure 13B:
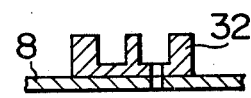
Figure 13C:
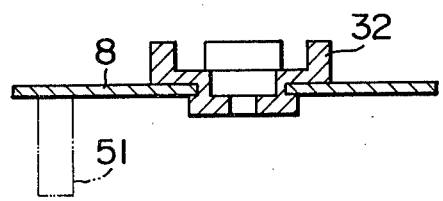
Figure 14:
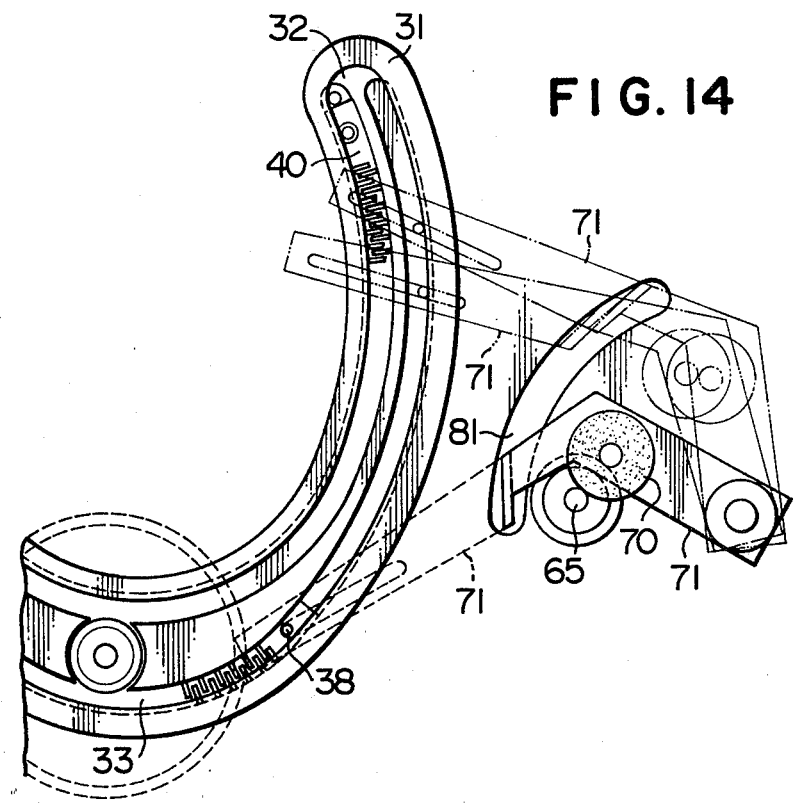
FIG. 14 is a plan view in explanation of the mechanism for operating a capstan and a pinch roller as a drive source for causing the flexible racks to move in sliding movement.

Operation of a capstan-pinch roller arrangement will be described by referring to FIGS. 12, 13 and 14 for feeding the magnetic tape 3 by using the sliding movement of the flexible rack 33 shown in FIGS. 8 and 10 as a drive source.

Figure 12:
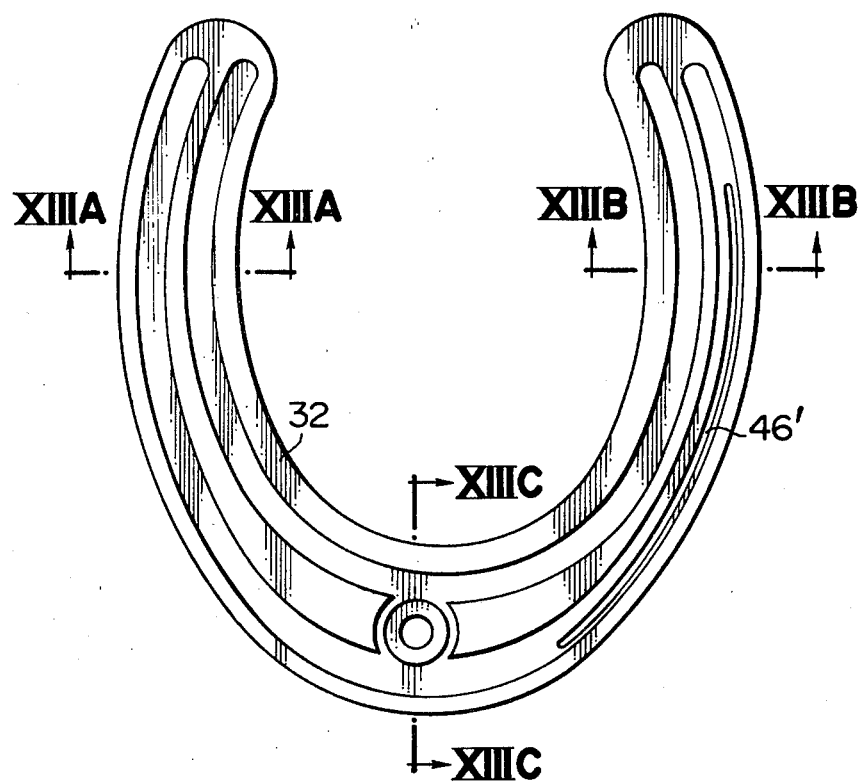
FIG. 12 is a plan view in explanation of the guide grooves shown in FIG. 5.
Figure 15:
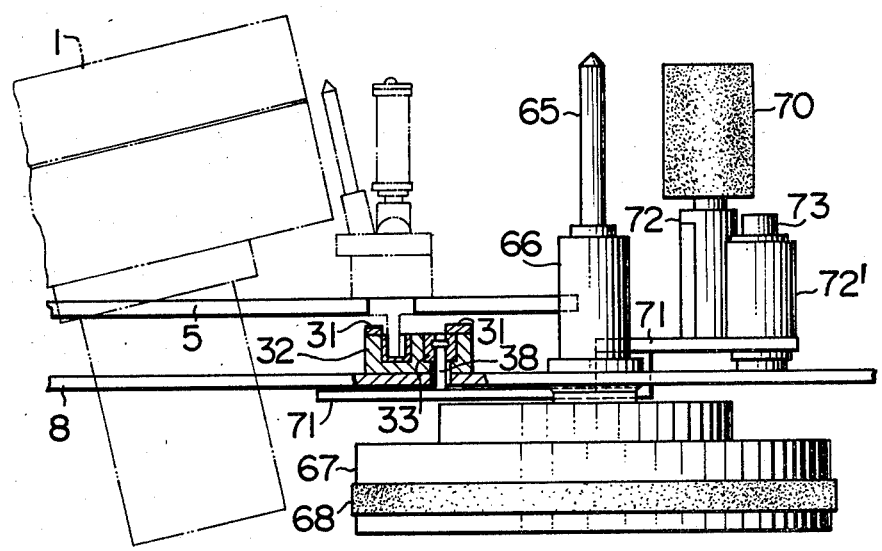
FIG. 15 is a side view, with certain parts being shown in section, of the mechanism shown in FIG. 14.

Referring to FIG. 12, the base 8 has thereon the guide groove member 32 formed with a slot 46' in the bottom of its outer groove. FIG. 13(B) shows this arrangement in section. In FIGS. 14 and 15, the flexible rack 33 having a molded pin 38 secured thereto is fitted in the outer groove of the guide groove member 32 and has the pin 38 extend downwardly of the base 8. A capstan 70 is mounted on a lever 71 that can be brought into contact with a capstan rotating shaft 65. The lever 71 is formed at its forward end portion with a slot for allowing the pin 38 to be engaged therein, and is formed at its intermediate portion in the form a letter Z (See FIG. 15). Thus the portion of the lever 71 from the intermediate to the forward end portion extend through a slot 81 of the arcuate shape formed in the base 8 and downwardly of the base, to be brought into engagement with the pin 38 of the flexible rack 33 fitted in the outer groove of the guide groove member 32. By this arrangement, the lever 71 is operated by the racks 33 and 40 as the latter move in sliding movement in the guide grooves of the guide groove member 32 to bring the capstan 70 into contact with the capstan rotating shaft 65.

Operation of the system according to the invention described hereinabove will be described. To move the magnetic tape withdrawing guide means 4 and 4' toward the magnetic tape guide member 1 as shown in FIG. 1, the projections 4d and 4d' of the magnetic tape withdrawing guide means 4 and 4' are inserted in the guide openings 37 and 44 and connected to the flexible racks 33 and 40 respectively. Upon the operator pressing a recording or playback button, not shown, the motor 60 and worm shaft 55 begin to rotate. Assuming that the worm gear 47 rotates clockwise in FIG. 5 at this time, the flexible racks 33 and 40 move in a magnetic tape withdrawing direction and cause the magnetic tape withdrawing guide means 4 and 4', through the projections 4d and 4d', to move along the respective guide grooves 6 and 6' on the guide base 5 so as to withdraw the magnetic tape 3 from the cassette 2. The magnetic tape withdrawing guide means 4 and 4' continue to move until they abut against the positioning members 7 and 7' respectively and stop as shown in dash-and-dot lines in FIG. 1. The inner groove and the outer groove of the guide groove member 32 are distinct in construction from each other and thus they have angles of movement of the racks fitted therein. This difference in the angle of movement is compensated by the flexing of the springs 34, 35 (FIG. 8), 41 (FIG. 9), 34a, 35a (FIG. 10) and 41a (FIG. 11). After the magnetic tape withdrawing guide means 4 and 4' has abutted against the positioning members 7 and 7' respectively, the magnetic tape 3 is driven to travel by the capstan 70 being brought into pressing engagement with the capstan rotating shaft 65. This state is detected as by a microswitch which produces a signal to cut off the supply of current to the motor 60. Details of this operation will be omitted because they do not form a part of the invention.

If it is desired to return the magnetic tape 3 to the cassette 2 from the state described hereinabove, the operator has only to cause the worm 47 to rotate in a direction opposite to the direction of its rotation described hereinabove.

Figure 18:
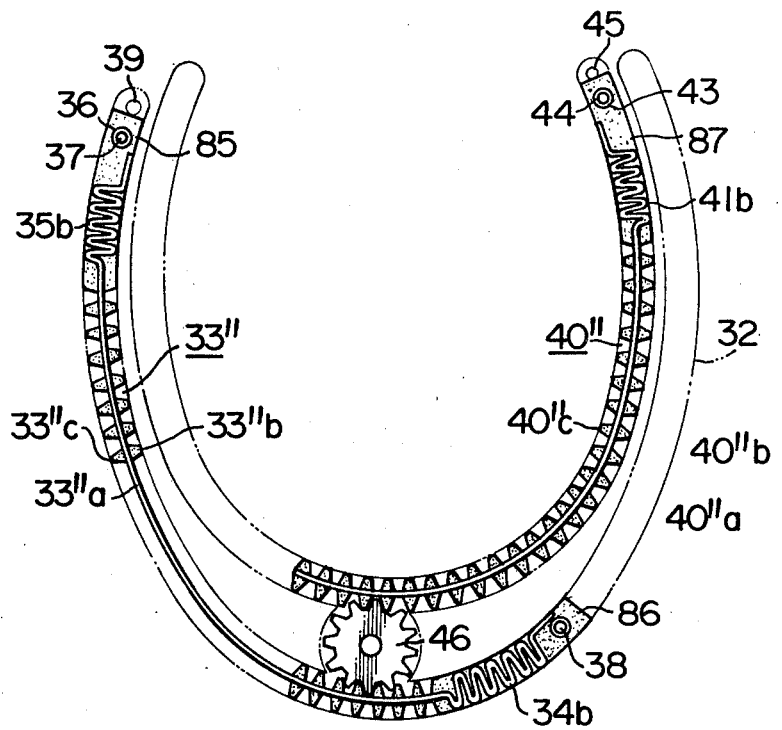
FIG. 18 is a plan view of still another form of flexible rack.
Figure 19A:
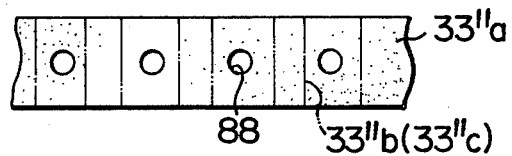
FIGS. 19(A) and 19(B) are a side view and a sectional view respectively of the essential portions of the flexible rack shown in FIG. 18.
Figure 19B:
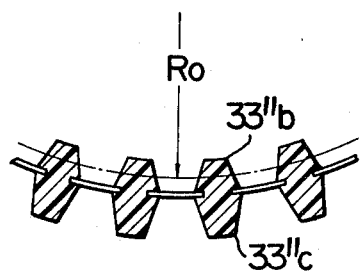

Other forms of flexible strip-shaped power transmitting members used in the invention will be described. FIG. 18 shows an example of the constructional form of the flexible racks which can be readily bent and yet have high tensile strength. These flexible racks 33" and 40" have, as shown in FIGS. 19(A) and 19(B), resilient strips 33"a and 40"a inserted in vertical neutral line portions thereof. The resilient strips 33"a and 40"a are each formed with openings 88 in positions corresponding to the tooth pitch of the pinion 46. Each opening 88 is filled with a resin to form a tooth 33"b (40"b) and a backing 33"c (40"c) integral with each other. The racks 33" and 40" include end portions 85 and 87 formed with the guide openings 37 and 44 respectively, and the rack 33" include another end portion 86 formed with the pin 38. Portions of the strips 33" and 40" in the vicinity of the portions 85, 86 and 87 are bent continuously as shown in FIG. 18 to provide spring portions 34b, 35b and 41b. The flexible racks 33" and 40" of the aforesaid constrictional form can be used in the same fashion as the form of flexible racks 33 and 40 described previously and can be driven by the pinion 46.

Figure 20:
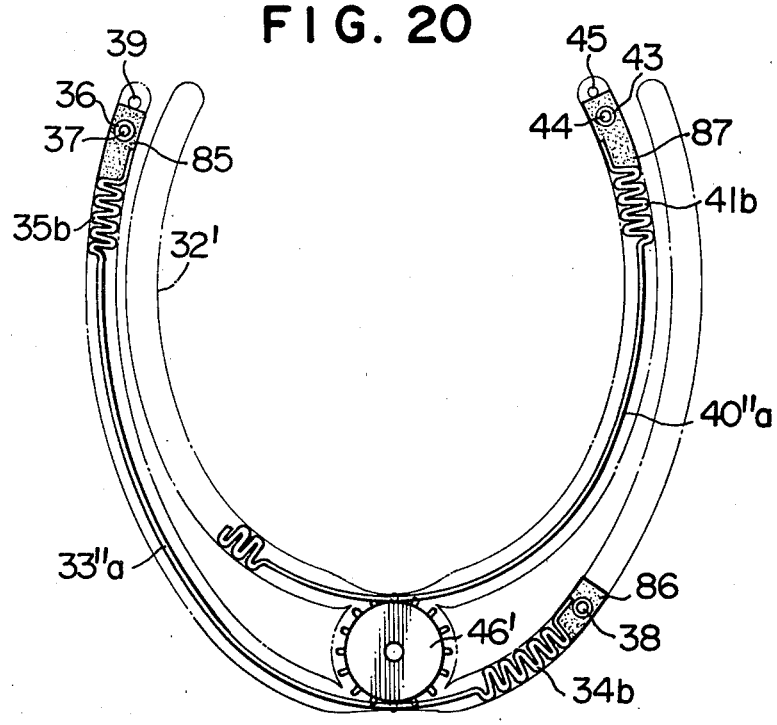
FIG. 20 is a plan view of one example of strip-shaped power transmitting members consisting only of strips.

FIG. 20 shows still another form of strip-shaped power transmitting members which are provided with the resilient strips 33"a and 40"a but have no teeth 33"b and backings 33"c shown in FIG. 19(A). The resilient strips 33"a and 40"a can be driven to move by a sprocket pinion 46' engaged in the openings 88 formed therein, or the sprocket pinion 46' can be replaced by a friction wheel for driving the resilient strips 33"a and 40"a by accommodating the friction wheel in a position on the guide groove member 32 in which the pinion 36' is located in FIG. 20. The space used for the friction wheel can be smaller than that for the sprocket pinion 46'.

Figure 21:
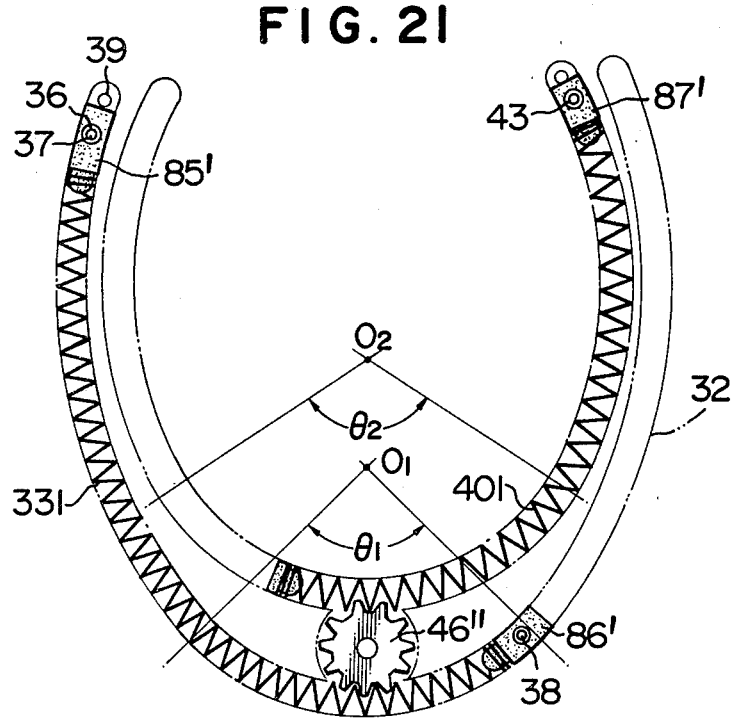
FIG. 21 is a plan view of one form of flexible rack of coil shape.
Figure 22:
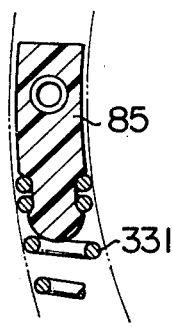
FIG. 22 is a sectional view showing in detail one end of the rack shown in FIG. 21.

A further form of flexible strip-shaped power transmitting members is shown in FIG. 21 in which the guide groove member 32 having two guide grooves have coil springs 331 and 401 fitted in the outer groove and the inner groove respectively as flexible racks. The coil spring 331 has a curvature centered at a point $O_1$ and is formed with convolutions of a pitch enabling the convolutions to be engaged by a sprocket pinion 46", and the coil spring 401 has a curvature centered at a point $O_2$ and is formed with convolutions of a pitch enabling the convolutions to be engaged by the sprocket pinion 46". The flexible racks 331 and 401 of the aforesaid coil form have connected thereto end portions 85' and 87' formed with the guide openings 37 and 44 respectively for connecting the flexible racks 331 and 401 to the magnetic tape withdrawing guide means 4 and 4'. The flexible rack 331 has another end portion 86' connected thereto and formed with the pin 38 for operating the lever 71 for driving the capstan roller 70 shown in FIGS. 14 and 15. FIG. 22 shows an example of the connection formed between the end portion 85' and the coil spring 331. The coil springs 331 and 401 constituting the flexible racks of the coil form of the aforesaid construction are driven by a sprocket pinion 46" to move in sliding movement in opposite directions along the two guide grooves of the guide groove member 32.

Figure 23A:
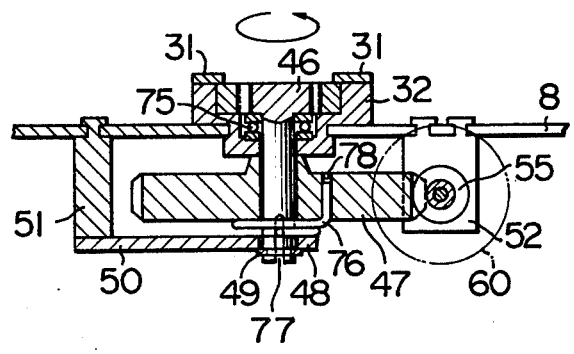
FIG. 23(A) is a view similar to FIG. 7 but showing a modification of the drive means shown in FIG. 7.
Figure 23B:
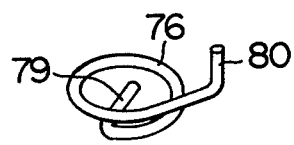
FIG. 23(B) is a perspective view of the torsion spring used in FIG. 23(A)

FIGS. 23(A) and 23(B) show a modification of the drive means shown in FIG. 7. In this modification, the worm wheel 47 is force fitted over the shaft of the pinion 46 integral with each other for rotation. The pinion shaft is formed at its lower end portion with an axial groove, and the worm wheel 47 is formed with a vertical hole 78. Hooks 79 and 80 of a torsion spring 76 are inserted in the axial groove and vertical hole 78 respectively. Thus rotation of the worm wheel 47 is transmitted to the pinion 46 via the torsion spring 76.

In the aforesaid construction the torsion spring 76 is capable of supplementing the action of the spring sections of the flexible racks (as indicated at 34 and 35 in FIG. 8 and at 41 in FIG. 9). Stated differently, the torsion spring 76 cooperates with the spring sections of the flexible racks to enable the contact pressure between the magnetic tape withdrawing guide means 4 and 4' and the positioning members 7 and 7' to be kept constant when the former are brought into contact with the other. Except for the parts described hereinabove, the parts of the mechanism shown in FIGS. 23(A) and 23(B) are substantially similar to those shown in FIG. 7.

From the foregoing description, it will be appreciated that in the present invention the carrier withdrawing guide means can be positively moved between a position in which a wire-shaped or tape-shaped carrier is brought into contact with the carrier guide member and a position in which the carrier is out of contact with the carrier guide member by the strip-shaped power transmitting members of novel construction. The use of the carrier contacting system according to the invention enables the mechanism for bringing the carrier into and out of contact with the carrier guide member to be simplified. For example, when the invention is incorporated in a system for bringing a magnetic tape into contact with the magnetic tape guide member as described an embodiment in this specification, it is possible to reduce the number of the component parts by 70%. This is conductive to reduced cost and increased reliability in performance.

In the illustrated embodiments of the invention, a pair of withdrawing guide means 4, 4' are utilized, and accordingly a pair of strip-shaped power transmitting members 33, 40 are provided. However, as can be seen with reference to U.S. Pat. No. 3,871,025, tape loading systems for withdrawing a tape from a cassette and bringing into engagement with a drum-shaped head are known which use a single withdrawing guide means. Thus, those skilled in the art will recognize that the present invention is applicable to this type of known system as well as the known system of FIGS. 1–4, and that, under such circumstances as when only a single withdrawing guide means is utilized, only a single strip-shaped power transmitting member would, likewise, be used.

What is claimed is:

1. An apparatus for bringing a tape-shaped carrier member received in a receiving section into contact with a drum-like carrier guide member in a predetermined position comprising:
   withdrawing guide means for engaging with said tape-shaped carrier member and for bringing the tape-shaped carrier member from said receiving section to a position in which the tape-shaped member is in contact with said drum-like carrier guide member;
   at least one flexible, strip-shaped power transmitting member connected to said withdrawing guide means;
   guiding means including at least one guide groove extending along a longitudinally curved path, said power transmitting member being longitudinally, movably fitted in said guide groove so as to be displaceable along said path, and being flexibly deformable to conform with the curved contour of said guide groove while it is moved in said guide groove;
   and
   means in engagement with said strip-shaped power transmitting member for driving it along said guide groove.

2. Apparatus as claimed in claim 1, wherein said tape-shaped carrier member is wound within a cassette and said withdrawing guide means is constructed so as to be receivable between a body of the cassette and portions of the tape-shaped carrier member wound therein so that said portions of the tape-shaped carrier member are located between the withdrawing guide means and said drum-like guide member.

3. An apparatus as claimed in claim 1, wherein said strip-shaped power transmitting member includes at least one spring portion.

4. An apparatus as claimed in claim 1 or 3, wherein said strip-shaped power transmitting member includes a rack formed with a plurality of cutouts for increasing flexibility of said rack.

5. An apparatus as claimed in claim 1, wherein said strip-shaped power transmitting member includes a rack formed with a plurality of cutouts for increasing flexibility of said rack.

6. An apparatus as claimed in claim 1 or 3, wherein two of said strip-shaped power transmitting members are provided, and said drive means includes rotary drive means interposed between the two strip-shaped power transmitting members in driving engagement therewith.

7. An apparatus as claimed in claim 1, wherein two of said strip-shaped power transmitting members are provided, each of said power transmitting members including a rack formed with a plurality of cutouts for increasing flexibility of said rack, and said drive means includes rotary drive means interposed between each rack and in engagement with the latter.

8. An apparatus as claimed in claim 5 or 7, wherein said rack has at least one spring portion.

* * * * *